United States Patent Office 3,344,754
Patented Oct. 3, 1967

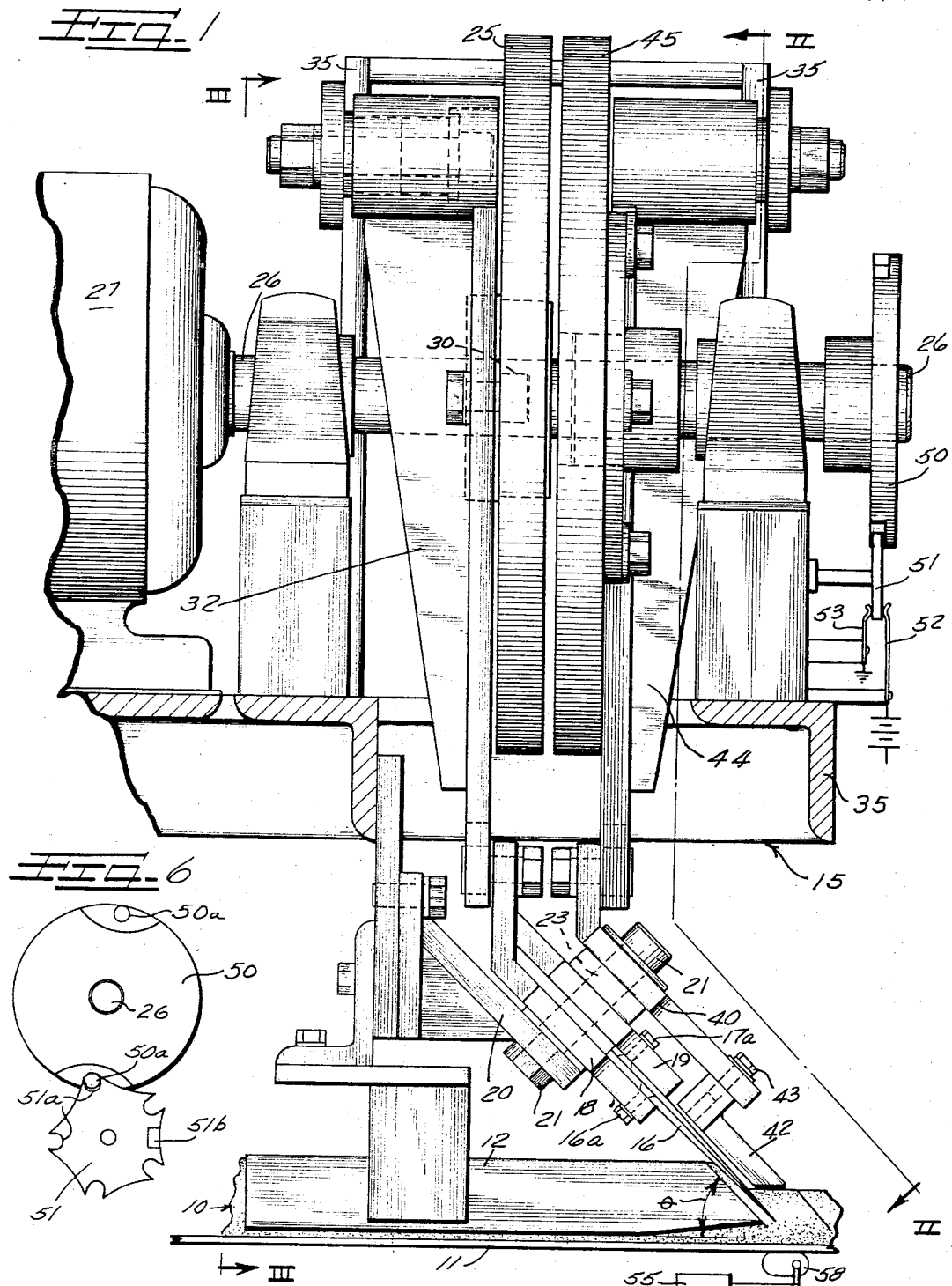

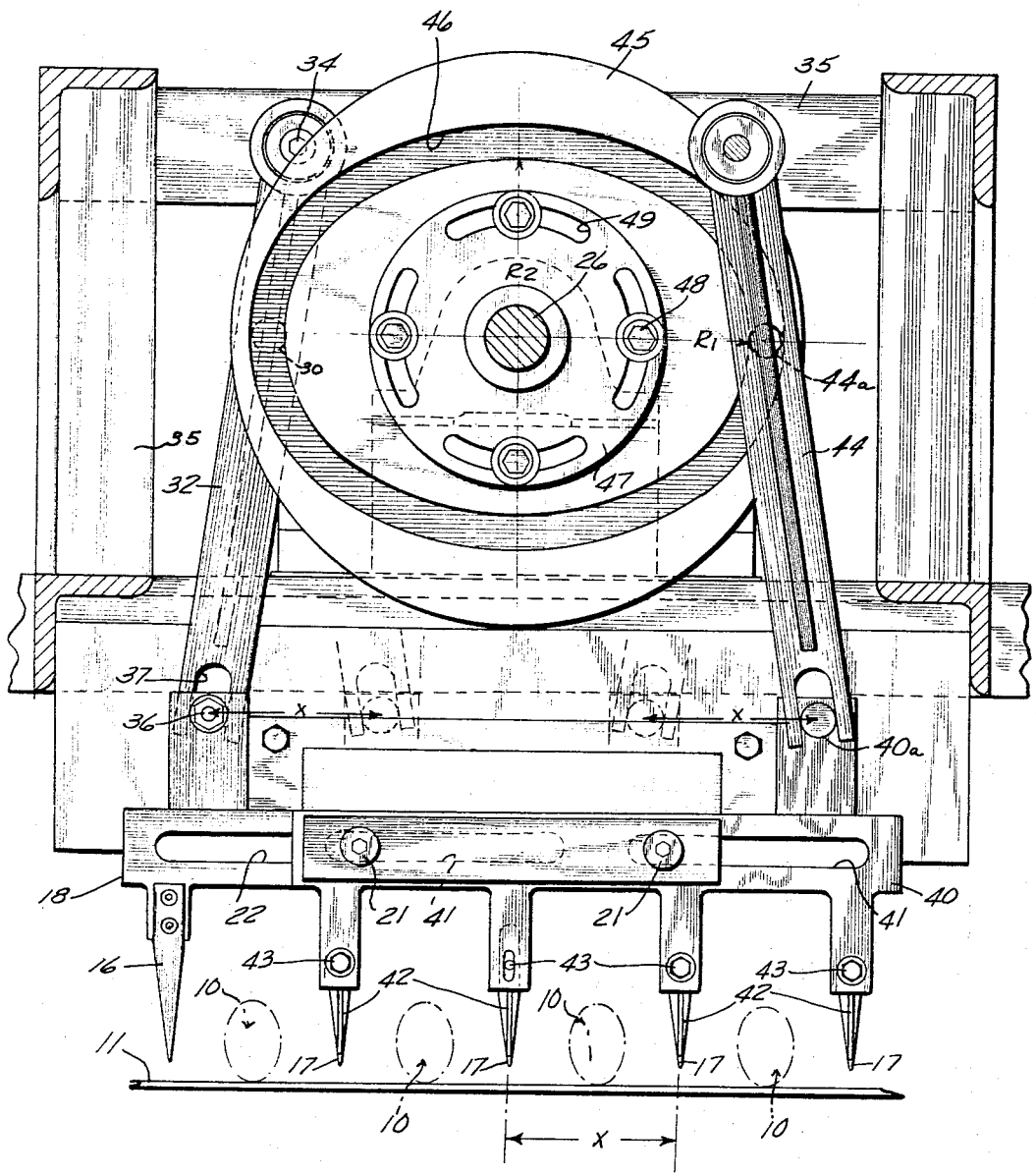

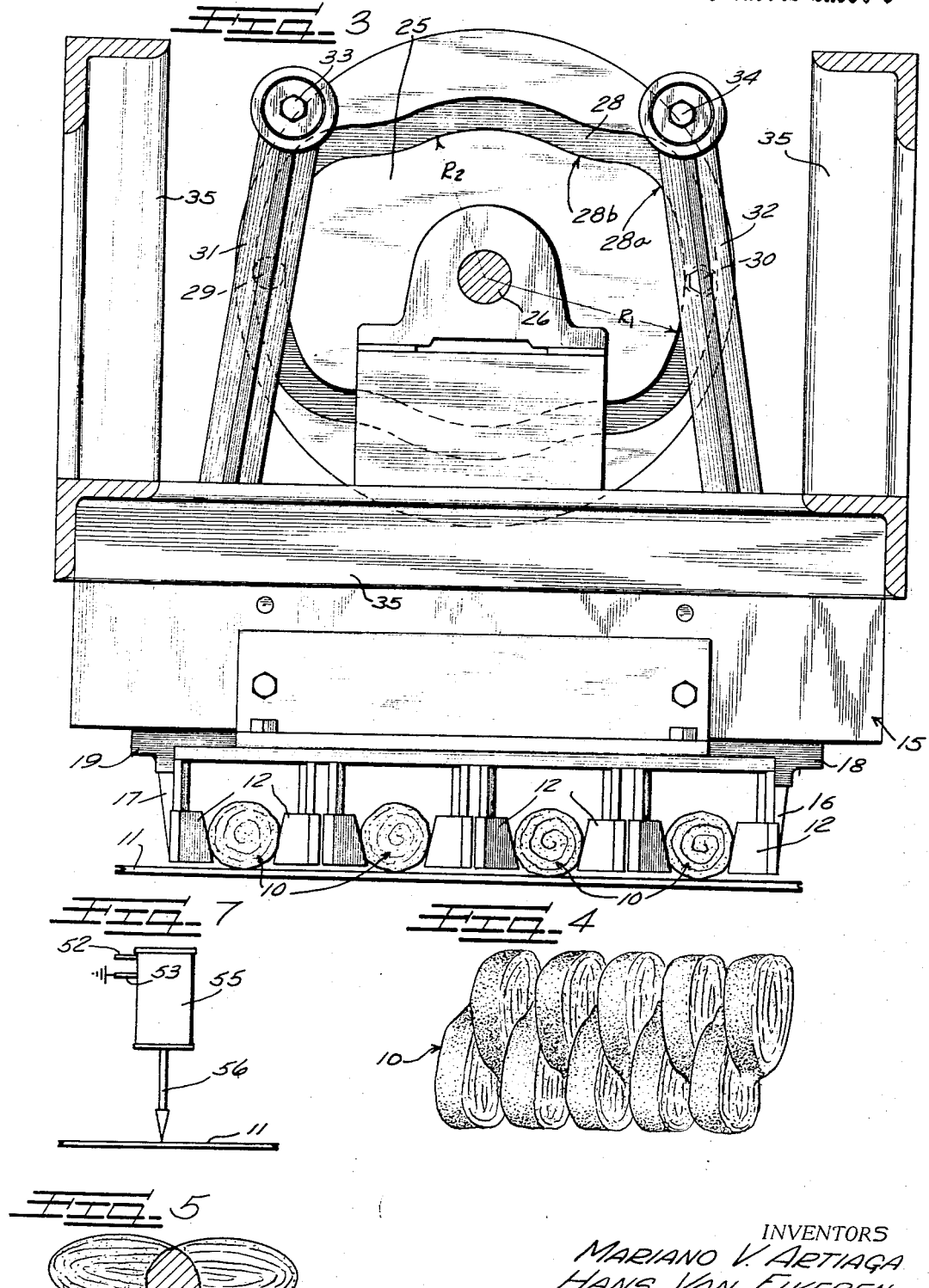

3,344,754
APPARATUS FOR MANUFACTURING PASTRY
Mariano V. Artiaga, Chicago, Hans Van Eikeren, Lincolnwood, and Andrew Wolf, Deerfield, Ill., assignors to Kitchens of Sara Lee, Inc., Deerfield, Ill., a corporation of Maryland
Filed May 19, 1965, Ser. No. 457,144
16 Claims. (Cl. 107—69)

ABSTRACT OF THE DISCLOSURE

The present apparatus is intended for the manufacture of Danish pastry of the type having a stem with leaf-like portions extending transversely therefrom in opposite directions. This pastry product is prepared by transversely slicing spirally wound pastry dough upon which cheese or the like has been spread and leaving a small unsliced area and deflecting the partial slices alternately in opposite directions relative to the unsevered portion. The pastry dough is then completely severed into individual pastries having a general configuration of a backbone with transversely extending leaves and ready to be baked and packaged.

---

The present invention relates to a pastry product and the apparatus employed in the manufacture thereof. More particularly, the invention is concerned with the manufacture of a Danish pastry product of the general class characterized as cheese coffee cakes. The Danish cheese coffee cake of the present invention takes the form, in its finished condition, of a longitudinally extending backbone-like stem having a plurality of alternately transversely extending leaf-like portions secured thereto. The pastry product of the present invention is constructed of thin pastry dough upon which a cheese or like layer is spread and the whole is rolled into a longitudinally extending spiral. The spirally wound pastry dough is sliced transversely of its longitudinal axis leaving a small unsliced area, and the individual partial slices are alternately deflected in opposite transverse directions relative to the unsevered portion. The pastry dough is severed completely through transversely of its longitudinal axis at spaced points providing a plurality of individual pastries having a general configuration of a backbone with transversely extending leaves. This product is then packaged and baked for marketing.

The Danish cheese coffee cake constructed as above specified is an aesthetically pleasing pastry. It may be prepared by hand, and we have employed various forms of apparatus to manufacture the product. To our knowledge, the apparatus hereinafter set forth and described provides a preferred apparatus for the manufacture of a pastry product or the like and provides much greater efficient productivity than is possible by hand or by other forms of apparatus considered.

Pastries having great aesthetic appeal are oftentimes extremely difficult to manufacture on a mass production basis. Thus, although many ornamental pastry forms have been conceived, the number of such products commercially marketed in large production quantities is quite small. On the other hand, the demand for unusual, aesthetically pleasing designs is great. In accordance with the present invention, a very pleasing pastry design is provided and apparatus perfected capable of manufacturing the pastry in a continuous, automatic, manner duplicating or, in fact, surpassing the design uniformity achievable by the manufacture of the product by hand.

It is, accordingly, an object of the present invention to provide a new and improved Danish pastry product. Still another object of the present invention is to provide an apparatus capable of continuously manufacturing a specific pastry in mass production quantities.

Still another object of the present invention is to provide an aesthetically pleasing pastry uniformly capable of being manufactured in large, commercial volume.

A feature of the invention resides in the provision of apparatus for rapidly slicing and gradually manipulating the pastry dough to provide a pastry product of substantially uniform appearance.

Another object of the present invention is to provide an apparatus for the cutting and manipulation of pastry dough and capable of extended continuous use without becoming clogged or otherwise inoperative.

Still a further feature of the invention is the provision of a novel method of manipulating pastry dough whereby subsequent baking provides a particularly aestheticaly pleasing coffee cake product.

Still other and further objects and features of the invention will at once become apparent to those skilled in the art from a consideration of the attached specification and the drawings, wherein a preferred embodiment of the invention is shown by way of illustration only, and wherein:

FIGURE 1 is a side elevational view of apparatus constructed in accordance with the present invention for the manipulation of pastry dough;

FIGURE 2 is a cross-sectional view taken along the line II—II of FIGURE 1 and illustrating in detail the structure of the flipper mechanism successfully operated in accordance with the present invention;

FIGURE 3 is an end elevational view of the apparatus shown in FIGURE 1 and taken along the line III—III;

FIGURE 4 is a plan elevational view of a product constructed in accordance with the method and apparatus of the present invention;

FIGURE 5 is a cross-sectional view of the product shown in FIGURE 4 taken along the line V—V;

FIGURE 6 is a cross-sectional view of the control cam taken along line VI—VI of FIGURE 1; and FIGURE 7 is a diagrammatic illustration of a modified form of severing mechanism.

As shown on the drawings:

In accordance with the present invention, a Danish pastry dough is rolled into a thin sheet by any well known means. A spread is applied to the sheet and the sheet is rolled into a generally cylindrical form having a spiral configuration in cross-section. The apparatus employed for rolling the dough and/or applying the cheese spread to it are not a part of the present invention and it will be understood by those skilled in the art that various devices already on the market may readily accomplish this task. Alternatively, the pastry dough may be rolled by hand to provide the generally solid longitudinally extending cylinder of dough.

It is, of course, entirely possible to bake a cylindrical cheese cake in the form above described. However, as above noted, an important object of the present invention is to provide an aesthetically appealing Danish pastry product. Accordingly, the pastry dough is cut and manipulted in the manner hereinafter more fully set forth.

As may be seen from a consideration of FIGURES 1 and 3, a generally cylindrical length of rolled pastry dough, indicated at 10, is moved by means of a conveyor belt 11 between guide surfaces 12 of a cutting and flipping apparatus generally indicated at 15. In the embodiment illustrated, the dough takes the form of a spirally wound cylinder composed of a continuous layer of Danish pastry dough spread with a cheese filling.

Preferably, the outermost edge of the dough, indicated at 13, for example, is positioned in a downwardly facing direction, resting upon the surface fo the conveyor. This provides a continuous backbone of pastry dough and provides a smooth, unbroken upwardly facing surface of the pastry after manipulation by the apparatus.

As the conveyor 11 carries the pastry dough 10 longitudinally through the apparatus in the direction shown by the arrows in FIGURE 1, the guides 12 accurately position the dough for cutting by reciprocating scissor members 16 and 17. The scissors 16 and 17 are moved, respectively, by scissor bars 18 and 19. The bars 18 and 19 are mounted for substantially horizontal reciprocal movement by supporting bracket 20 carrying horizontally spaced guide pins 21 which co-operate with longitudinally extending slots 22 and 23 in the scissor bars 18 and 19. The individual scissor bars 18 and 19 carry the respective scissor blades 16 and 17 by way of screws 16a and 17a respectively and, as clearly seen from FIGURE 1, the blades 16 and 17 are inclined at an angle $\theta$ from the horizontal. This inclination provides a downstream wiping action on the scissor blades 16 and 17 tending to make the scissor blades self-cleaning in operation. Additionally, the downstream angling of the cutting blades relative to the pastry dough prevents the dough from building up against the scissor blades in any way and permits substantially continuous movement of the dough on its conveyor belt in spite of the substantially transverse movement of the scissor blades during their severing operation.

The scissor blades 16 and 17 are reciprocated by means of a scissor cam 25 rotated by a cam shaft 26 driven by any conventional external source of power, such as for example, an electric motor illustrated at 27 in FIGURE 1. The scissors cam is illustrated in FIGURE 3 and comprises a positive cam track 28 which co-operates with a pair of follower rollers 29, 30 carried by lever arms 31 and 32 respectively pivoted at 33 and 34 to the fixed apparatus frame 35. The lower ends of the arms 31 and 32 are drivingly connected to the respective scissor blades in the manner illustrated in FIGURE 2. As there shown, the lever arm 32 is connected to the reciprocal scissor blades 16 by way of a pin 36 carried rigidly with the scissor blade bar 18 and which in turn co-operates with the slot 37 in the end of lever 32. As a result of rotational movement of the shaft 26, which is keyed rigidly to cam 25, the cam follower roller 30 is moved radially inwardly and outwardly relative to the center of rotation of shaft 26 to cause reciprocation of the attached scissor blade bar 18. Simultaneously, cam follower 29 is moved radially inwardly and outwardly relative to the shaft 26 to cause oscillation of lever arm 31 and reciprocal movement of the scissor blades 17.

The cam track 28 is constructed, as may clearly be seen from FIGURE 3, to provide two cycles of oscillation of the levers 31 and 32 for each revolution of the cam shaft 26. In the position illustrated in FIGURE 3, the scissor blades are in their extreme outboard positions. A consideration of the cam 25 shows that the track 28 is made up of four sections of substantially constant radius. In the position of the parts shown in FIGURE 3, the followers 29 and 30 are seated in portions of the track 28 having a first substantially constant radium $R_1$. As the cam 28 is rotated by a cam shaft 26 in a clockwise direction, as viewed in FIGURE 3, the follower 30, for example, remains stationary until the cam 25 rotates to a position in which the point 28a is adjacent the follower 30. At this point, the track 28 moves toward the center of cam shaft 26 rapidly until it reaches a point 28b, at which point the track 28 continues at a substantially constant smaller radius $R_2$. The difference between $R_1$ and $R_2$ is a distance sufficient to provide a distance of movement X at the point of contact between the arms 31 and 32 and the respective scissor blades. This dimension is shown in FIGURE 2, for example, where lever 32 is drivingly connected to scissor blade bar 18 by way of a follower pin 36 riding in slot 37 of the lever 32. The scissor blade bar 18 reciprocates to the dotted line position shown in FIGURE 2 and is moved a distance X by the cam 28.

In view of the fact that a majority of the total elapsed time of a rotation of the cam 28 is taken up by co-operation of the links 31 and 32 with portions of the cam track 28 that are of unchanging radius, the portions of cam track 28 of changing radius provide an extremely rapid movement. Thus, for each quarter revolution of the cam 28, approximately 60° of rotation occur without movement of the scissor blades, while only approximately 30° of rotation occur during scissor blade actuation. The result of this relationship is that with constant rotation of the cam 25, the scissor blades are actuated only intermittently and that actuation occurs at an extremely rapid rate.

In considering the scissor movement, the embodiment of the invention illustrated provides a construction in which cutting action is accomplished by both sides of the scissor blades. Thus, upon rotation of the cam 25, through a first quarter turn of rotation from the position shown in FIGURE 3, both the levers 31 and 32 will be moved toward each other a distance X which causes the individual scissor blades 16 and 17 to pass completely through the pastry, crossing each other along the vertical centerline of the pastry and changing position to opposite sides of the pastry. During the next quarter turn of rotation of the cam 25, the scissor blades will again cross through the pastry in the opposite direction, returning to their original position, and crossing each other again along the centerline of the pastry. Due to the portions of the cam track 28 that are of constant radius, the scissor blades actually move during only a small portion of the rotation of the cam 25 and this intermittent action permits the conveyor to carry the pastry approximately ¾′ downstream relative to the scissor blades during each quarter revolution of the cam. Accordingly, during continuous movement of the conveyor, and continuous movement of the cam, the scissors co-operate to slice the pastry at points longitudinally spaced along the pastry. In actual practice, we have found it satisfactory for providing an aesthetically pleasing and readily handled cheese cake to operate the conveyor at a speed coupled with a speed of rotation of the cam 26, providing approximately ¾″ between successive scissor cuts. The apparatus has been successfully operated at the rate of aproximately 225 inches per minute conveyor speed. The number of severed leaves per inch may be readily varied, however, by changing the speed of rotation of shaft 26 or the speed of the supporting conveyor.

Immediately following the scissors action which partially severs the pastry dough, the portion of the dough just severed is flipped to one side of the longitudinal axis of the traveling pastry. In accordance with the present invention, successive severed portions are flipped on opposite sides of the longitudinal axis of the dough to provide an alternately flipped pastry product having a plan view generally in the form illustrated in FIGURE 4. Flipping of the successive leaves is accomplished by means of a flipper bar generally illustrated in FIGURE 2 at 40. The bar 40 is mounted for reciprocal movement relative to the mounting posts 21 by way of slots 41 and carries a plurality of flipper arms 42 secured thereto by fasteners 43. The bar 40 is actuated by lever arm 44 through the distance X. As shown in FIGURE 2, the arm 44 is controlled by cam follower 44a and, in turn, controls actuator bar 40 via pin 40a.

While it is important, as above noted, to employ a rapid scissors action with respect to the operation of the scissor blades 16 and 17, it is equally desirable to employ a gradual force application by the flipper members 42. This is accomplished by employing a cam 45 having a cam track 46 in the form illustrated in FIGURE 2. As there shown, the track is generally elliptical in shape and has a maximum radius $R_1$ and a minimum radius $R_2$ equal to the respective $R_1$, $R_2$ of cam track 28 of the cutter cam. However, instead of providing a zone of rapid blade movement as in the case of cam track 28, the track 46 moves from a point of radius $R_1$ to the point of radius $R_2$ in a substantially constant rate throughout the period of travel. This provides a relatively slow, gentle, movement of the flipper members 42 against the pastry and provides manipulation of the pastry dough without injury to it.

The cam 45 is secured to hub 47 which is secured by screws 48 to cam 25 for rotation with cam shaft 26. Slots 49 are provided to permit adjustment of the cam 45 relative to the cam 25. This adjustment is made to provide for contact of the individual flipper member 42 with the edge of the pastry dough immediately following severance of the dough by the scissor blades. This requires that the flipper blade members 42 slightly lag behind the motion of the scissor blades, since the scissor blade must be at the vertical centerline of the pastry dough, thereby completing the severance, by the time the flipper member 42 contacts the side of the pastry dough for manipulation thereof. By rotating the cam 45 relative to the cam 25, this following action can be adjusted to the exact dimension of the dough. In this connection, it will be observed that the movement of the flipper members 42 and the bar 40 is identical in extent to the movement of the scissor blades. Since only one flipper bar is employed, and is oscillates at the same cyclic speed as the scissor blades, it will first flip the dough to the left, as viewed in FIGURE 2, and then to the right, upon the return stroke. The flipper members 42 will cause two leaves to be flipped on one side of the centerline of the dough and two leaves to be flipped on the opposite sides of the centerline of the dough with each full rotation of the cam shaft 26.

With the apparatus described above, a continuous ribbon of pastry dough is provided having alternately flipped leaves supported by a central backbone. For purposes of marketing the product, it is desired that the ribbon be severed into convenient lengths. A very satisfactory and highly salable product has been provided by severing the individual lengths at a dimension of approximately 9 inches, or, with five leaves on each side of the longitudinal axis. Such a product is illustrated in FIGURE 4. The complete severance required to provide individual units as illustrated in FIGURE 4 may be accomplished in a number of ways. It is possible, of course, to manually separate individual units by means of a knife, at the output station of the aparatus. However, it is preferable to automatically sever the ribbon at appropriate lengths and several means are illustrated for accomplishing this purpose.

Preferably, a knife is actuated after a finite number of flips. In the embodiment illustrated, this action occurs after ten leaves have been flipped relative to the longitudinal axis of the pastry dough. Since four flips occur with each revolution of the cam shaft 26, mechanism of any conventional form may be employed to actuate the knife after two and one-half revolutions of the cam shaft 26 have occurred. One way of accomplishing this timing is to employ a cam 50 carried by the cam shaft 26 for the control of an electrical switch 51, or the like. As illustrated in FIGURES 1 and 6, such a cam actuated switch may employ a Geneva movement of conventional form having a pair of contact pins 50a co-operating with slots 51a in switch member 51. By providing a five-sided Geneva follower 51 with two drive pins 50a, two and one-half rotations of the cam shaft 26 will cause one rotation of the member 51. An electrically conductive segment 51b is provided for conducting electricity between contacts 52 and 53 forming a portion of an electrical circuit controlling pastry severing means.

One form of pastry severing means illustrated takes the form of a conventional guillotine form of a knife blade reciprocably actuated by a solenoid or the like. This is shown in FIGURE 7 and incorporates a solenoid coil 55 energized by electrical contacts 52 and 53 under the control of switch 51. Upon energization of the solenoid 55, the blade 56 is moved rapidly downwardly into the position illustrated in FIGURE 7 against the conveyor, thereby severing the ribbon into a series of pastry units. In FIGURE 7 the knife 56 is shown in a generally vertical position, but it will be understood that it may be placed at an incline similar to the incline of the scissors so as to provide a cut at the same general angle as the cuts forming the leaves. In the embodiment illustrated in FIGURE 7, the knife 56 may, of course, be positioned at any spot in the system, and may, in fact, be positioned upstream of the scissors, within the area of the guide members 12.

It is possible to employ the scissors 16 and 17 to provide complete severance of the ribbon, if desired. This may be accomplished by lifting the conveyor intermittently by cam device such as illustrated in FIGURE 1. As there shown, the solenoid 55 may oscillate a lifting cam 58 causing the conveyor to lift to a position in which reciprocation of the scissor blades during every tenth cut causes severance of the complete ribbon. It will be understood that various techniques may be employed for severing the pastry dough without departing from the novel concepts of the present invention.

After the pastry product has been manipulated as above described, it is baked and, if desired, frozen, for distribution to the public. It has been found that this pastry product is aesthetically very pleasing and the product has found great favor with the purchasing public.

It will be apparent to those skilled in the art that variations and modifications may be made in accordance with the principles of the present invention without departing from the novel concepts of our invention. For example, variations in the specific construction of the scissor members may be employed. Oscillating scissor blades rather than reciprocating scissor blades and, similarly, oscillating flippers, may be utilized. It is important, in constructing such minor variations, however, to employ mechanism for providing a fast scissors action and a relatively slow flipper action in order to assure that the scissor blades do not unnecessarily interfere with the movement of the pastry along the conveyor and at the same time to assure that the pastry dough is not harshly handled by the flipper mechanism. In view of the many changes in apparatus that are possible, it is our intention that the scope of the present invention be limited solely by that of the hereinafter appended claims.

We claim as our invention:

1. Apparatus for shaping a generally continuous ribbon of pastry dough comprising a conveyor belt having means associated therewith for positioning the ribbon longitudinally thereof for movement thereby along the longitudinal axis of the ribbon, means operable transversely of the ribbon and acting to cut the ribbon from the top to a point adjacent to but spaced from the bottom thereof, flipper means immediately downstream of said cutting means and transversely movable relative to the ribbon and alternately contacting opposite sides thereof to flip successive sliced leaves of dough in opposite directions about the unsevered portion of the ribbon, and means severing the flipped ribbon into lengths each having a plurality of flipped leaves.

2. Apparatus for shaping a generally continuous ribbon of pastry dough comprising a conveyor belt having means associated therewith for positioning the ribbon longitudinally thereof for movement thereby along the longitudinal axis of the ribbon, means operable transversely of the ribbon and acting to cut the ribbon from the top to a point adjacent to but spaced from the bottom thereof, flipper means immediately downstream of said cutting means and transversely movable relative to the ribbon and alternately contacting opposite sides thereof to flip successive sliced leaves of dough in opposite directions about the unsevered portion of the ribbon, guide means holding said ribbon against transverse horizontal movement during said flipping, and means severing the flipped ribbon into lengths each having a plurality of flipped leaves.

3. Apparatus for shaping a generally continuous ribbon of pastry dough comprising a conveyor belt having means associated therewith for positioning the ribbon longitudinally thereof for movement thereby along its longitudinal axis, means operable transversely of the ribbon and acting to cut the dough from the top of the ribbon to a point adjacent but spaced from the conveyor, flipper means immediately downstream of said cutting means and transversely movable relative to the ribbon and alternately contacting opposite sides thereof to flip successive leaves of dough in opposite directions about the unsevered portion of the ribbon, and means severing the flipped ribbon into lengths each having a plurality of flipped leaves, said cutting means being inclined at an angle relative to the horizontal to produce a cut inclined from the top downwardly and in the direction of movement of the ribbon.

4. Apparatus for shaping a generally continuous ribbon of pastry dough comprising a conveyor belt having means associated therewith for positioning the ribbon longitudinally thereof for movement thereby along the longitudinal axis of the dough, scissor means comprising a pair of blades movable toward each other transversely of the ribbon in the horizontal direction and acting to cut the ribbon at a centerline intersecting the centerline of the ribbon and extending from the top surface of the ribbon to a point adjacent but spaced from the bottom surface thereof, flipper means immediately downstream of said scissor transversely movable relative to the dough and alternately contacting opposite sides thereof to flip successive sliced leaves of dough in opposite directions about the unsevered portion of the ribbon.

5. Apparatus for shaping a generally continuous ribbon of pastry dough comprising a conveyor belt having means associated therewith for positioning the ribbon longitudinally thereof for movement thereby along the longitudinal axis of the dough, scissor means comprising a pair of blades movable toward each other transversely of the ribbon in the horizontal direction and acting to cut the ribbon at a centerline intersecting the centerline of the ribbon and extending from the top surface of the ribbon to a point adjacent but spaced from the bottom surface thereof, flipper means immediately downstream of said scissor transversely movable relative to the dough and alternately contacting opposite sides thereof to flip successive sliced leaves of dough in opposite directions about the unsevered portion of the ribbon, and means severing the flipped ribbon into lengths each having a plurality of flipped leaves.

6. Apparatus for shaping a generally continuous ribbon of pastry dough comprising a conveyor belt having means associated therewith for positioning the ribbon longitudinally thereof for movement thereby along the longitudinal axis of the ribbon, scissor means comprising a pair of blades movable toward each other transversely of the ribbon in the horizontal direction and acting to cut the ribbon at a centerline intersecting the centerline of the ribbon and extending from the top surface of the ribbon to a point adjacent but spaced from the conveyor, flipper means immediately downstream of said scissor transversely movable relative to the ribbon and alternately contacting opposite sides thereof to flip successive sliced leaves of dough in opposite directions about the unsevered portion of the ribbon, guide means holding said ribbon against transverse movement during said flipping, and means severing the flipped ribbon into lengths each having a plurality of flipped leaves.

7. Apparatus for shaping a generally continuous ribbon of pastry dough comprising a conveyor belt having means associated therewith for positioning the ribbon longitudinally thereof for movement thereby along the longitudinal axis of the ribbon, scissor means comprising a pair of blades movable toward each other transversely of the ribbon in the horizontal direction and acting to cut the ribbon at a centerline intersecting the centerline of the ribbon and extending from the top surface of the ribbon to a point adjacent but spaced from the conveyor, flipper means immediately downstream of said scissor transversely movable relative to the ribbon and alternately contacting opposite sides thereof to flip successive sliced leaves of dough in opposite directions about the unsevered portion of the ribbon, and means severing the flipped ribbons into lengths each having a plurality of flipped leaves, said scissors being inclined at an angle relative to the horizontal to produce a cut inclined downwardly and forwardly in the direction of movement of the ribbon.

8. Apparatus for shaping a generally continuous ribbon of pastry dough comprising a conveyor belt having means associated therewith for positioning the ribbon longitudinally thereof for movement thereby along the longitudinal axis of the ribbon, means operable transversely of the ribbon and acting to cut the ribbon from the top to a point adjacent but spaced from the conveyor, flipper means immediately downstream of said cutting means and transversely movable relative to the ribbon and alternately contacting opposite sides thereof to flip successive sliced leaves of dough in opposite directions about the unsevered portion of the ribbon, and means severing the flipped ribbon into lengths each having a plurality of flipped leaves, said cutting means and flipper means being synchronized to provide contact by said flipper means with the dough substantially simultaneously with completion of each cut.

9. Apparatus for shaping a generally continuous ribbon of pastry dough comprising a conveyor belt having means associated therewith for positioning the ribbon longitudinally thereof for movement thereby along the longitudinal axis of the ribbon, means operable transversely of the ribbon and acting to cut the ribbon from the top to a point adjacent but spaced from the conveyor, flipper means immediately downstream of said cutting means and transversely movable relative to the ribbon and alternately contacting opposite sides thereof to flip successive sliced leaves of dough in opposite directions about the unsevered portion of the ribbon, and means severing the flipped ribbon into lengths each having a plurality of flipped leaves, said cutting means and flipper means being synchronized to provide contact by said flipper means with the dough substantially simultaneously with completion of each cut, and said cutting means being actuated at a high velocity relative to said flipper means during contact with the ribbon.

10. Apparatus for shaping a generally continuous ribbon of pastry dough comprising a conveyor belt having means associated therewith for positioning the ribbon longitudinally thereof for movement thereby along its longitudinal axis, means operable transversely of the ribbon and acting to cut the ribbon from the top to a point adjacent but spaced from the conveyor, flipper means immediately downstream of said cutting means and transversely movable relative to the ribbon and alternately contacting opposite sides thereof to flip successive sliced leaves of dough in opposite directions about the unsevered portion of the ribbon, said pastry dough being spread with filling and rolled into a ribbon having a spiral cross section.

11. Apparatus for shaping a generally continuous ribbon of pastry dough comprising a conveyor belt having means associated therewith for positioning the ribbon longitudinally thereof for movement thereby along its longitudinal axis, means operable transversely of the ribbon and acting to cut the ribbon from the top to a point adjacent but spaced from the conveyor, flipper means immediately downstream of said cutting means and transversely movable relative to the ribbon and alternately contacting opposite sides thereof to flip successive sliced leaves of dough in opposite directions about the unsevered portion of the ribbon, and means severing the flipped ribbon into lengths each having a plurality of flipped leaves, said pastry dough being spread with filling and rolled into a ribbon having a spiral cross section.

12. Apparatus for shaping a generally continuous ribbon of pastry dough comprising a conveyor belt having means associated therewith for positioning the ribbon longitudinally thereof for movement thereby along its longitudinal axis, means operable transversely of the ribbon and acting to cut the ribbon from the top to a point adjacent but spaced from the conveyor, flipper means immediately downstream of said cutting means and transversely movable relative to the ribbon and alternately contacting opposite sides thereof to flip successive sliced leaves of dough in opposite directions about the unsevered portion of the ribbon, and means severing the flipped ribbon into lengths each having a plurality of flipped leaves, said pastry dough being spread with filling and rolled into a roller having a spiral cross section, the outermost edge of the spiral lying substantially adjacent the conveyor surface to remain unsevered.

13. Apparatus for shaping a generally continuous ribbon of pastry dough comprising a conveyor belt having means associated therewith for positioning the dough longitudinally thereof, scissor means comprising a pair of blades movable toward each other transversely of the dough and normally acting to cut the dough substantially at the centerline thereof from the top of the ribbon to a point adjacent but spaced from the conveyor, flipper means immediately downstream of said scissor transversely movable relative to the dough and alternately contacting opposite sides thereof to flip successive sliced leaves of dough in opposite directions about the unsevered portions of the ribbon, and means severing the ribbon into lengths.

14. Apparatus for shaping a generally continuous ribbon of pastry dough comprising a conveyor belt having means associated therewith for positioning the dough longitudinally thereof, scissor means comprising a pair of baldes movable toward each other transversely of the dough and normally acting to cut the dough substantially at the centerline thereof from the top of the ribbon to a point adjacent but spaced from the conveyor, flipper means immediately downstream of said scissor transversely movable relative to the dough and alternately contacting opposite sides thereof to flip successive sliced leaves of dough in opposite directions about the unsevered portions of the ribbon, and means severing the ribbon into lengths, said last-named means including means counting the number of leaves flipped and means operative to sever said ribbon completely upon flipping a predetermined number of leaves.

15. Apparatus for shaping a generally continuous ribbon of pastry dough comprising a conveyor belt having means associated therewith for positioning the dough longitudinally thereof, scissor means comprising a pair of blades movable toward each other transversely of the dough and normally acting to cut the dough substantially at the centerline thereof from the top of the ribbon to a point adjacent but spaced from the conveyor, flipper means immediately downstream of said scissor transversely movable relative to the dough and alternately contacting opposite sides thereof to flip successive sliced leaves of dough in opposite directions about the unsevered portions of the ribbon, means counting the number of leaves flipped and means operative to sever said ribbon completely upon flipping a predetermined number of leaves, said last-named means comprising a generally vertical movable knife.

16. Apparatus for shaping a generally continuous ribbon of pastry dough comprising a conveyor belt having means assocated therewith for positioning the dough longitudinally thereof, scissor means comprising a pair of blades movable toward each other transversely of the dough and normally acting to cut the dough substantially at the centerline therefrom from the top of the ribbon to a point adjacent but spaced from the conveyor, flipper means immediately downstream of said scissor transversely movable relative to the dough and alternately contacting opposite sides thereof to flip successive sliced leaves of dough in opposite directions about the unsevered portions of the ribbon, means counting the number of leaves flipped, and means operative to sever said ribbon completely upon flipping a predetermined number of leaves, said last-named means comprising means moving said scissors and said conveyor relatively closer together to cause said scissors to intermittently completely sever said ribbon.

References Cited
UNITED STATES PATENTS

| | | | |
|---|---|---|---|
| 2,573,708 | 11/1951 | Hall | 107—9 |
| 2,690,142 | 9/1954 | Whitehead | 107—68 X |

FOREIGN PATENTS

| | | |
|---|---|---|
| 1,102,062 | 3/1961 | Germany. |
| 852,009 | 10/1960 | Great Britain. |

WALTER A. SCHEEL, *Primary Examiner.*

J. SHEA, *Examiner.*